March 17, 1970   J. H. ROPER   3,500,635
GAS PRESSURE PRODUCING APPARATUS
Filed April 11, 1968

INVENTOR
JOHN H. ROPER
BY
ATTORNEY
AGENT

# United States Patent Office 3,500,635
Patented Mar. 17, 1970

3,500,635
GAS PRESSURE PRODUCING APPARATUS
John H. Roper, 1325 Eutaw Place,
Baltimore, Md. 21217
Continuation-in-part of application Ser. No. 623,049, Mar. 14, 1967. This application Apr. 11, 1968, Ser. No. 726,273
Int. Cl. B01d 47/02; F01n 3/04; F02b 75/10
U.S. Cl. 60—29                                 1 Claim

ABSTRACT OF THE DISCLOSURE

An apparatus for obtaining pressurized motive gas from a compression ignition engine for supplying a system of gas pressure actuated devices, having a withdrawal port for the flow of gas from a power cylinder of the engine, a conduit means communicating with the withdrawal port and connected through a ball check valve and a gas cleaning and cooling device to a storage reservoir, the dimensions of the gas passageways and flow rates of gas therethrough are so coordinated to the operating conditions of the internal combustion engine as to obtain a sufficient flow of motive gas without seriously imparing the operation of the engine.

---

This application is a continuation-in-part of co-pending application Ser. No. 623,049 filed Mar. 14, 1967, now abandoned.

This invention relates to an apparatus for supplying pressurized motive gas to a system of gas actuated devices and, more particularly, to an apparatus capable of supplying both driving rotational motive power and pressurized gas without the necessity of including an engine driven auxiliary air compressor, with resulting simplification and realization of economies.

In many uses of prime movers, it is necessary to provide pressurized motive gas to operate accessory or auxiliary gas actuated devices. Perhaps the most widely known example of the need for such motive gas occurs in motor vehicles such as large buses and trucks. In such vehicles, certain accessory groups such as brakes, windshield wipers, door operators and the like are actuated by the use of pressurized motive gas. Conventionally, the gas so applied to the system of devices is obtained from an auxiliary air compressor driven by an operative connection to the crankshaft of the internal combustion engine which serves as a prime mover for the vehicle.

Such uses of auxiliary air compressors, while heretofore conventional, are subject to readily recognizable deficiencies. In particular, the compressors so provided usually represent a compromise between the economic considerations entering into the design and construction of the motor vehicle and the possible flow requirement of pressurized gas, with the flow rate provided frequently being less than optimum due to the high initial cost of the auxiliary compressor and the power drain imposed thereby on the engine. As a result, operation of the motor vehicle under conditions where frequent operation of the gas actuated system or portions thereof is required results in exhaustion of the reserve of pressurized motive gas. A specific example of such an occurrence occurs with in-town operation of a passenger bus, wherein brake and door operations at each corner require such quantities of compressed air as to force a driver to stop his vehicle solely to accumulate compressed air in the gas reservoir.

In addition to the deficiency of an insufficient volume of flow of gas, such auxiliary compressors present continuing maintenance problems both as to the compressor itself and as to the combination thereof with the engine.

The operating life of such a compressor is substantially shorter than that typical of an engine, particularly under the stop and go operating conditions typical of an in-town bus route, and the shaft or other means providing the operative connection between the auxiliary compressor and the prime mover presents a possibility of mechanical failure. In some installations, the cylinder head of an auxiliary compressor is included in the water coolant circuit for the engine and, in the event of compressor head gasket failure, has been known to force the coolant liquid from the engine with attendant dangers of significant engine damage.

It has heretofore been proposed that a pressurized motive gas be derived from the cyyinder of an internal combustion engine, as such a cylinder is an efficient and long-life air compressor. To the knowledge of the present inventor, no such proposals have been commercially successful heretofore, due to several deficiencies. More particularly, recently proposed systems are so complicated as to substantially increase the operating complexity, the initial cost, or both of a prime mover, inasmuch as those systems are directed either to conversion of one or more cylinders of a prime mover for temporary operation solely as compressor cylinders with an attendant reduction in the number of power cylinders or to valve arrangements for variably bleeding air from a cylinder.

With the aforementioned difficulties and deficiencies heretofore encountered particularly in mind, it is an object of the present invention to provide an apparatus for supplying pressurized motive gas which is simple and uncomplicated, relatively maintenance free, and which supplies gas without practical detriment to the efficiency of a prime mover. In realizing this object, this invention contemplates the combination with a compression ignition internal combustion engine of certain auxiliary structure for conducting gas from a working cylinder of the engine, retaining the gas under predetermined pressure conditions, and supplying the gas to a system of gas actuated devices such as a vehicle accessory group including brake cylinders, door operators and the like.

A more specific object of this invention is to provide, in combination with a compression ignition internal combustion engine, means for conducting a flow of gas from a cylinder thereof in predetermined correlation to the operating characteristics of the engine, due to predetermined relationships between the engine and the means.

Some of the objects and advantages to the invention having been stated, others will appear as the description proceeds, when taken in connection with the accompanying drawings, in which FIGURE 1 is a schematic illustration of the gas compressor apparatus of this invention including a section through a compression ignition internal combustion engine;

Figure 1:
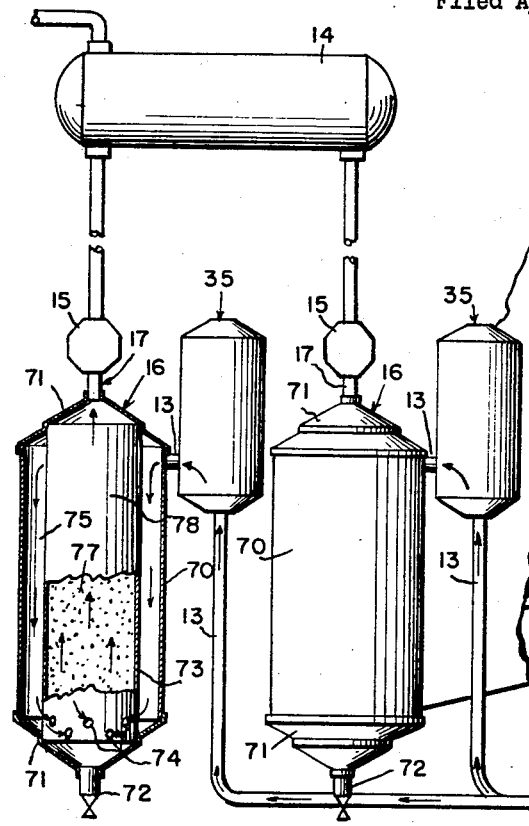

Referring now more particularly to the drawing, the apparatus of this invention is there schematically represented and generally indicated in FIGURE 1. In accordance with the present invention, the apparatus there shown comprises a compression ignition internal combustion engine, generally indicated at 11; an orifice ball check valve indicated at 34; conduit means connected to the engine and generally indicated at 13; a gas reservoir for retaining gas at a predetermined pressure generally known in the field as the "wet tank," and indicated at 14; a pressure regulator generally indicated at 15; an elevated pressure-stripper valve generally indicated at 35;

and one or more gas cleaning and cooling devices generally indicated at 16. Each of these elements in the combination of the present invention, mentioned generally here by way of introduction, will be described more fully hereinafter as a detailed discussion of the present invention proceeds.

The internal combustion engine 11 contemplated by the present invention is of the compression ignition type, operating generally on either a Diesel cycle or on a mixed cycle approximating a Diesel cycle, and preferably includes a plurality of cylinders 20 (only one of which is shown by the partial section of FIGURE 1), an equal number of pistons 21 reciprocable in respective ones of the cylinders 20, and a cylinder head 25 closing the cylinders 20 and defining therewith combustion chambers 26. Upon rotation of the crankshaft of the engine the pistons 21 are reciprocated within the cylinders 20 to admit a charge of compressible gaseous medium such as air and compress the gaseous medium therewithin. Upon compression of the gaseous medium within the cylinders, fuel is injected thereinto for combustion within the chambers 26 with the charge of gaseous medium. Upon such combustion of fuel, the combustion products gases act on the respective pistons 21 to result in the application of motive force to the crankshaft, driving that shaft in rotation. Each piston in the engine 11 applies such motive force to the crankshaft and a cylinder wherein combustion occurs and motive force is thus applied through a piston is referred to herein as a power cylinder. As motive force is applied to the crankshaft, the engine 11 is capable of serving as a prime mover in a suitable installation, such as in a motor vehicle.

In order to conduct a flow of gas from at least one of the cylinders 20 of the engine 11, this invention includes an orifice ball check valve 34, a conduit means 13 communicating with at least a selected one of the cylinders 20. The conduit means 13 includes an elevated pressure-stripper valve 35 that passes only high pressure gas. The conduit means 13 includes gas cleaning and cooling device 16, so that the conduit means the power cylinders of the engine and thus the application of motive force to pistons reciprocating therewithin is maintained where the flow rate of gases withdrawn from the power cylinder, in practicing this invention, does not exceed approximately 10% of the flow rate of gases through the cylinder in normal power stroke operation. Stated differently, but with substantially the same result, the compression pressure within the cylinder (without the injection and combustion of fuel) must not be reduced, by the loss of gases withdrawn therefrom, to a level below that at which substantially correct engine operation occurs. With modern engine designs, a compression pressure reduction of approximately 10% can be tolerated without substantially impairing the combustion of injected fuel. To the end of limiting the flow of gas supplied by the apparatus of this invention, means are provided for restricting the extraction of gas from the power cylinders to within the limits here given.

To this point, the broad nature of the present invention has been generally discussed while certain critical features have been pointed out. It is believed, however, that the specific application of this apparatus can best be understood from a non-limiting illustrative example. One operating embodiment of the apparatus of the present invention has been constructed, for example, in conjunction with a 6V71 Detroit Diesel engine used as a prime mover for a General Motors coach. The 6V71 engine is a compression ignition internal combustion engine having six cylinders, each of 71 cubic inch displacement; direct injection combustion chambers operating on a two-stroke cycle; a Roots blower for supercharging; and valves for exhaust only. The compression pressure of the 6V71 engine, without injection or combustion of fuel, is approximately 600 p.s.i.g. and the mean effective pressure during power stroke operation is within a range centering around approximately 90 p.s.i.g.

In incorporating a 6V71 engine into the apparatus of the present invention, passageways are drilled through the cylinder head of the engine to open into the clearance volume of selected cylinders and thus provide both direct operative communication for the conduit means of the apparatus and the supply limiting means. The passageways drilled in the cylinder head must be so arranged as to avoid the cored cooling water passages formed in the head at time of manufacture, and, while the gas passageways may range from $\frac{1}{16}$ to $\frac{3}{16}$ of an inch in diameter, experience has shown that the optimum size for the opening into the clearance volume of the selected cylinders is obtained with a diameter of one-eight inch. Stated in terms of the open area communicating directly with the clearance volume of the cylinder, the optimum has been found to be approximately .012 square inch, within a range of from .003 to .027 square inch. In accordance with the general discussion above, and in view of the cylinder displacement of 71 cubic inches, a flow rate of withdrawn gases of up to approximately 7½ cubic feet per minute through a pressure regulator valve adjusted to maintain a reservoir pressure of approximately 120 p.s.i.g. is permissible at a typical engine operating speed of 2100 r.p.m. Such a flow rate is obtained and the compression pressure is reduced by no more than 10% where an opening into the clearance space having the optimum area value is made. With this flow rate of gas extracted from the cylinder, heat must be thrown off at a rate of approximately 125 B.t.u./min. in order to maintain the gas in the reservoir substantially at ambient temperatures.

Figure 2:
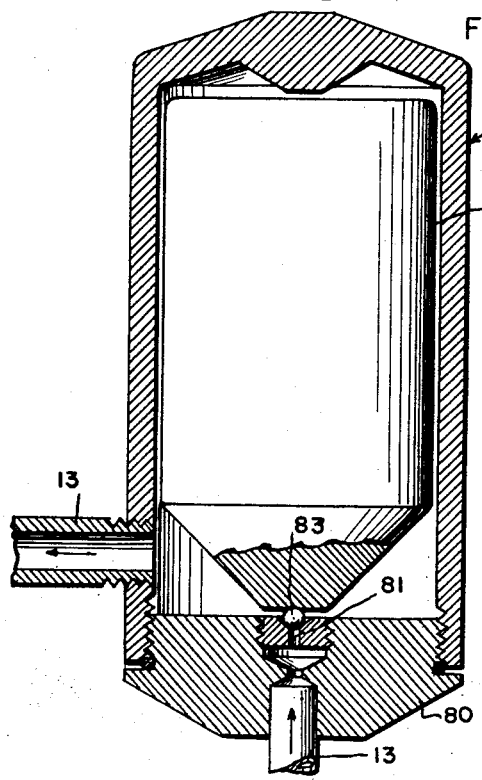
FIGURE 2 is an enlarged vertical section through a back flow limiting valve incorporated in the apparatus of FIGURE 1.

In the apparatus herein described, it has been noted that the attainment of steady state flow conditions when the desired flow rate of output gases is withdrawn from the engine 11 requires a certain time interval after the engine is started, such as about 5 minutes in the instance of a 6V71. It is believed that this delay in attaining steady state flow conditions results at least in part from back flow of compressed gases from the conduit means 13 through the cylinder head passageways 31 and into the engine cylinder 20 upon opening of the cylinder exhaust valve. In order to permit obtaining the desired flow rate of withdrawn gases with a shorter delay before steady state conditions are attained, this invention comprehends an embodiment wherein a back flow limiting valve 34 (FIGURE 2) is included in the conduit means 13 and interposed between the cylinder head passageways 31 and the pressure-stripper valve 35 and the gas cleaning and cooling device 16. The flow limiting valve 34 comprises a valve body 61 threaded to engage a tapped opening in the cylinder head passageway 31 and to receive a conduit means 13. In order to limit back flow of gases from the conduit means 13 into the cylinder 20, the valve 34 includes a ball flow control member 62, movable between two valve seats 64 and 65 in order to control communication between the cylinder head passageway 31 and the conduit means 13. With ball 62 against cage 65 flow from left to right in FIGURE 2 is permitted but any reverse flow will force ball 62 against seat 64 and stop such flows.

In order to obtain a satisfactory operating life for the flow limiting valve 34, the body 61 of that valve is preferably formed of "Monel," while the ball member 62 and valve seats 64 and 65 are made of "Stellite." In order to assure that leakage of withdrawn gases from the flow limiting valve 34 does not occur, a hollow bolt member 67 closes the insertion passageway for the valve seats 64, 65 and ball member 62 gas tight. Through the use of the flow limiting valve 34, back flow of pressurized gases withdrawn from the cylinder of the engine 11 into the cooling device.

The gas cleaning and cooling device 16 cools gas flowing therethrough from the cylinder 20 of the engine 11, by permitting heat to flow from the gas until it is substantially at the temperature of the ambient surroundings. Preferably, the cross-sectional area of the gas conduit 13 as compared to that of the passageway 32 in the orifice ball check valve 34 is such as to provide a predetermined, and substantial, expansion ratio, in order that gas flowing from the cylinder and through the conduit means 13 may expand in volume by a factor of approximately 4.05.

In order to retain pressurized motive gas at a predetermined pressure, and to supply such retained gas to a system of gas actuated devices, this invention provides the gas reservoir 14. In a typical motor vehicle, this reservoir may be the first of a series of pressurized gas vessels referred to as "wet tanks" and "dry tanks," from which motive gas ultimately is delivered to a system of gas actuated devices such as a vehicle accessory group including a brake system, door operators and the like under the control of suitable driver or passenger actuated flow control valves, as well known in the vehicle industry.

In the connection between the pressurized gas vessel 14 and the gas cleaning and cooling device 16 a pressure regulator 15 is located.

It has been noted that the withdrawal of gas from a cylinder must be limited in order to continue obtaining motive force from the piston reciprocating in the cylinder and such limitation of gas flow is an important distinction of the present invention. With a modern compression ignition internal combustion engine, operating with a compression ratio within a range centered on approximately 16:1, combustion of fuel injected into cylinder as the pressures therein drop toward the intake pressure is prevented. As applied specifically to the 6V71 engine, the use of the flow limiting valve 34 permits attaining a steady flow of withdrawn gases at the desired rate approximately 30 seconds after the engine is started.

In order to improve the quality of the withdrawn gas by reducing the products of combustion contained in the gas mass, an elevated pressure-stripper valve 35 is communicated by conduit 13 between flow limiting valve 34 and the gas cleaning and cooling device 16.

Figure 3:
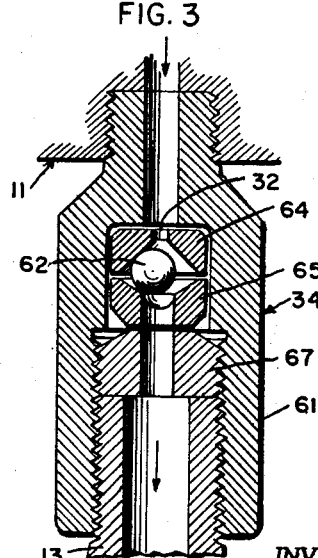
FIGURE 3 is a vertical section through an elevated pressure stripper valve incorporated in the apparatus of FIGURE 1.

The elevated pressure-stripper valve 35 receives high pressure gas in its base 80 communicated by conduit 13. Orifice 81 is in relation to the pressure of the gas so that a predetermined pressure of approximately 500 p.s.i.g. weight 82 is moved allowing ball 83 to pass any volume of gas whose pressure is in excess of 500 p.s.i.g. The gas is communicated by conduit 13 to the gas cleaning and cooling device 16 as shown in FIGURE 3.

While the pressure-stripper valve 35 is shown controlled by the weight 82, the valve may be controlled in any suitable manner, such as, operatable by predetermined fluid pressure within or without the system. The ball valve 83 may also be controlled by means either mechanically or electronically operated responsive to the temperature of the gases passing through the system, or by the relative position of the piston in relation to the cylinder in which the piston is operating. Another mode of operation may be triggered by the fuel injecting means, or in a conventional internal combustion engine by the ignition system.

In view of the above, it is readily apparent that gas compression apparatus has been disclosed by general discussion and specific non-limiting examples which is particularly advantageous in its simplicity, economical construction and long operational life. These features are obtained in particular through the use of at least one cylinder of a compression ignition internal combustion engine as both a power cylinder and a compressor cylinder and by tapping off a limited portion of the flow of gas through that cylinder.

The withdrawn gases are admitted to the gas cleaning and cooling device 16 by conduit means 13.

The gas cleaning and cooling device comprises an outside cylinder 70 having closure caps 71 securely welded at each end thereof forming a gas tight canister with metal connectors 17 adapted to the pressure regulator 15 at the exit upper end and drain valve 72 connected at the bottom end as shown in FIGURE 1. The internal tube 73 is held centrally of tube 70 by closure caps 71 thus forming a hollow cylindrical space 75 between large tube 70 and small tube 73. This hollow cylindrical space 75 is in communication with conduit means 13 and acts as a gas expansion chamber where the expansion factor is approximately 44 to 1. The gases in the hollow cylindrical space 75 give up heat to the surface of tube 70. The low velocity of the mass flow of the gases thru the hollow cylindrical space 75 allows sufficient time to cool the gases below the dew point before entering orifices 74 where the gases are introduced to a liquid bath 77 where the gases are cleaned of their solids and waters by agitation caused from the low velocity flow thru the bath 77. The clean cool gases flow from the bath into a settling chamber 78 where low velocity flow allows gravity to pull the small droplets back into the liquid bath. The clean cool gases flow thru connector 17 to the pressure regulator 15 and into the gas reservoir 14.

The bath 77 contains a colorless, practically odorless liquid that is hygroscopic in nature and readily miscible with water such as, for example, triethylene glycol. It has a molecular weight of 150.17 and its composition is denoted by the formula $C_6H_{14}O_4$. There is also suspended one or more alkalizing agents that are insoluble in the liquid and relatively insoluble in water. These may be oxides, hydroxides, carbonates or salts of the alkaline earth metals but are not restricted to this group. Other compounds such as aluminum oxide may also be used. Inert materials such as silica or insoluble drying agents such as silica gel may also be present.

Another bath of 10–W–20 detergent engine lube oil has proven to possess all the features of the triethylene glycol and may be employed.

Acidic products of combustion bubbling through the liquid are neutralized rapidly by the alkalizing agent or agents. This serves to maintain a uniform pH in the organic liquid and to prevent corrosion and pitting of the metal parts of the bath.

In FIGURE 1 of the drawing, two gas cleaning and cooling units are shown. The above description applied to one of said units applies equally to both as they are duplicates. It is understood that the number of such units may vary depending on the load requirements of the system.

In the drawings and specification, there have been set forth a preferred embodiment of the invention, and although specific terms are employed, they are used in a generic and descriptive sense only and not for purposes of limitation, the scope of the invention being defined in the claim.

I claim:

1. In combination with an internal combustion engine block having a compression chamber therein for burning gases under pressure including apparatus for supplying gas under pressure to a system of pressure actuated accessory devices, comprising:
   (a) a small conduit means extending through the engine block and connected with the combustion chamber for conducting a relatively small portion of the burning gas therefrom at a substantially high pressure and temperature and into a gas cleaning and cooling device,
   (b) an expansion orifice positioned adjacent the engine block of smaller diameter than the conduit leading from said block and the diameter of the conduit leading therefrom for reducing the pressure and the temperature of the said gas,
   (c) the gas cleaning and cooling device having an outer closed casing and an inner closed casing fixedly secured within and centrally of the outer casing providing an annular space between the walls of the inner and outer casing for further reducing the pressure and temperature of the said gases by expansion of the gas within the said space, (d) a conduit connected between the expansion orifice and the annular space of the outer casing adjacent the top thereof, (e) perforations in the inner casing adjacent the lower end thereof, (f) a conduit outlet communicating with the upper end of the interior of the said inner casing and a gas storage tank, and (g) a liquid bath in the casings covering the perforations in the inner casing wherein the gas introduced at the inlet connection of the outer casing passes downwardly through the annular space, through the perforations and through the liquid bath cleaning the same, and then upwardly through the inner casing and out the outlet connection to the gas storage tank whereby reduction of pressure and temperature through the system including the expansion orifice and the annular space about the outer casing of the cleaning and cooling tank is adapted to reduce the temperature of the gas to a minimum low of 450° Fahrenheit between the time the gas has passed through the annular space of the cleaning and cooling tank.

References Cited

UNITED STATES PATENTS

| | | | |
|---|---|---|---|
| 355,594 | 1/1887 | Daimler | 55—245 |
| 1,111,556 | 9/1914 | Bakels | 60—29 |
| 1,143,395 | 6/1915 | Hole | 60—29 |
| 1,327,769 | 1/1920 | Molas | 60—29 |
| 1,414,993 | 5/1922 | Milburn | 55—252 |
| 1,516,857 | 11/1924 | Kavaney | 55—255 |
| 3,216,181 | 11/1965 | Carpenter et al. | 55—256 |

WENDELL E. BURNS, Primary Examiner

U.S. Cl. X.R.

55—244; 123—198